Dec. 20, 1927.

C. T. ULREY 1,653,380

SEAL FOR X-RAY TUBES

Filed Jan. 13, 1926

INVENTOR
CLAYTON TRIDLE ULREY
BY
ATTORNEY

Patented Dec. 20, 1927.

1,653,380

UNITED STATES PATENT OFFICE.

CLAYTON TRIDLE ULREY, OF EAST ORANGE, NEW JERSEY, ASSIGNOR TO WESTINGHOUSE LAMP COMPANY, A CORPORATION OF PENNSYLVANIA.

SEAL FOR X-RAY TUBES.

Application filed January 13, 1926. Serial No. 80,932.

This invention relates to gas-tight seals between glass and metal and more particularly to forming such a seal between a hollow body of metal and a hollow body of glass.

In the manufacture of such devices as X-ray tubes and other discharge devices, it is desirable to seal a hollow metallic body to the glass walls of the envelope or to a flare tube. In making the seal between the glass and the metal, it has been the practice to merely insert one end of a hollow glass body within a hollow body of metal, the walls of the two bodies being disposed in parallelism. The seal is then produced by heating the metal body to a red heat and then blowing air into the hollow glass body to force the glass, which has become plastic through contact with the heated metal, against the inner walls of the hollow metallic body, thus fusing the two bodies together. Although good seals can at times be made in this manner, it not infrequently happens that the seals are imperfect due to air bubbles being entrapped between the glass and the metal, such bubbles not being afforded an opportunity of escaping prior to the fusing of the glass to the metal adjacent the upper edge of the metal body. It has been found that by flaring the metal body adjacent the edge which is sealed to the glass body, that this difficulty is avoided, thus providing seals free from entrapped air bubbles.

Therefore, it is an object of the present invention to provide a simple method whereby it is possible to form seals between glass and metal without the danger of air bubbles being entrapped therebetween.

A further object to the invention is to provide a seal for X-ray tubes and the like which may be expeditiously manufactured and in which the seal is gas-tight and free from entrapped bubbles.

Other objects of the invention will become apparent as the following description is read.

Referring to the drawings for a better understanding of the invention,

Figure 1:
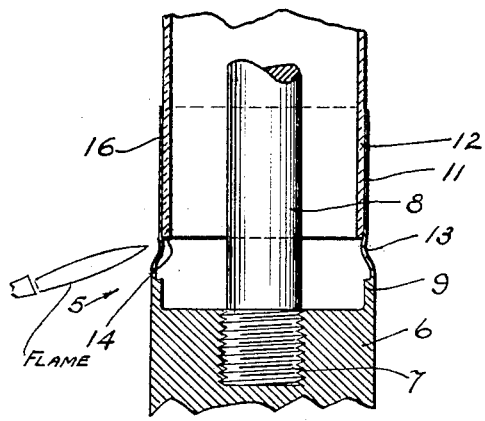
Fig. 1 is a vertical sectional view of a seal as previously constructed and prior to the fusion of the glass to the metal.
Figure 2:
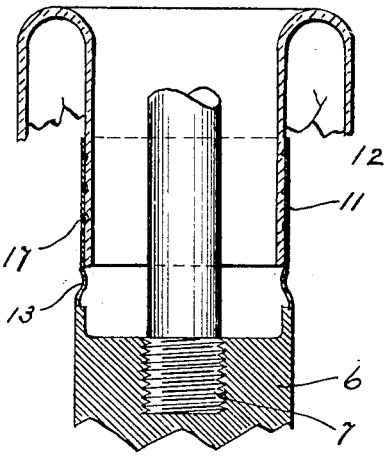
Fig. 2 is a view, similar to Fig. 1, after the fusion of the glass to the metal and showing entrapped air bubbles between the glass and metal.
Figure 3:
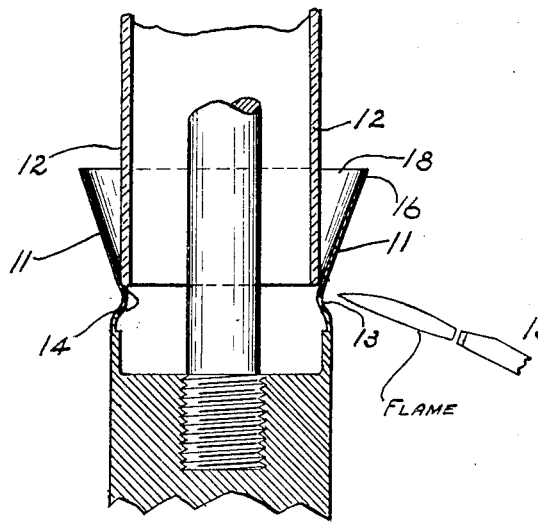
Fig. 3 is a vertical sectional view of the present invention showing the position of the hollow glass body within the hollow metal body prior to producing the seal.
Figure 4:
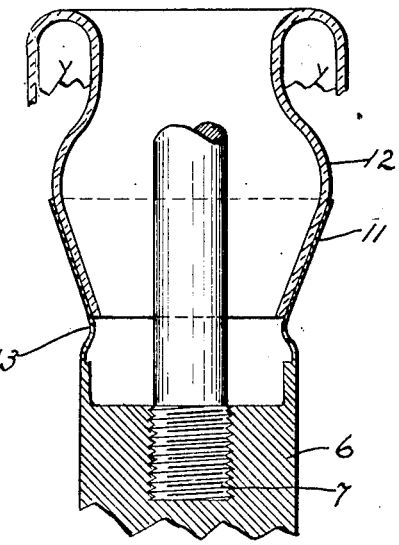
Fig. 4 is a vertical sectional view of a seal manufactured in accordance with the present invention.

The present invention as described hereinafter, relates particularly to the manufacture of seals for X-ray tubes and the like and in this connection, there is illustrated in Figs. 1 and 2 of the drawings a hollow cylindrical body 5 having a solid shank 6, into which is secured by a threaded connection 7, a stem 8 to which a radiator, not shown, may be attached. The cylindrical body 5 has projecting outwardly therefrom an annular flange 9 having a reduced end 11 of such thickness, preferably about .008", that it will stretch with the glass when the latter expands and contracts. This reduced portion 11 is sealed to a glass tube 12. An annular inwardly projecting shoulder 13 is provided to serve as a stop, so as to limit the distance the glass tube 12 is inserted within the annular flange 9.

The flange 11 is principally made of copper although other metals, such as chromium, a chromium alloy, or a nickel-iron core coated with copper or chromium, may be employed.

In making the seal, the glass tube 12 is inserted within the annular flange 9 until the lower edge 14 rests against the stop 13, thereafter the two bodies are rotated in a flange 15 which is directed against the lower edge of the reduced section 11 of the annular flange of copper. The copper becomes heated to a red heat which results in the glass becoming plastic. Air is then admitted within the glass tube 12 to bring the plastic glass into firm contact with the reduced section 12, thus forming the seal.

It is obvious that in making a seal in this manner wherein the walls of glass and metal are in parallelism, as illustrated in Figs. 1 and 2, there is a certain amount of air disposed between these walls. Owing to the fact that the glass may be of the same plasticity throughout the entire mass disposed within the reduced section 11, the sealing between the glass and metal may take place at a point above the stop 13, prior to sealing adjacent the stop 13, thus preventing the air disposed between the glass and the metal from moving outwardly at the upper edge 16, with the result that the seal is rendered imperfect by the presence of air bubbles 17, as illustrated in Fig. 2.

According to the present invention good seals may be produced without danger of entrapping the air bubbles, this being accomplished by outwardly flaring the reduced portion 11 so that the glass walls and the annular wall of metal 12 are not in parallelism and furthermore so that there is a slight space 18 between the glass 12 and the upper edge 15 of the outwardly flared metal wall 11.

With this construction, it will be obvious that when the flame 15 is applied adjacent to the annular stop 13 and the metal wall 11 heated to a red heat that the glass at the lower end 14 of the glass tube 12 will have a higher degree of plasticity than the glass adjacent the upper edge 16 of the annular flange 11 so that when the air is admitted within the tubular glass body 12, the glass will be pressed against the metal body 11 gradually from the portion thereof where it contacts with the stop 13 to the upper edge 16 of the annular flange 12 thus forcing the air between the glass and the metal outwardly through the space 18 between the glass and the metal. In this manner a ready exit is always provided for any of the air between the glass and the metal.

It is possible by reason of the present invention to manufacture the seals in a more expeditious manner and furthermore to always secure seals free from entrapped air bubbles.

Although the invention has been described with particular reference to a seal for an X-ray tube, it is obvious that the same is applicable to the production of seals for any hollow body which is desired to be sealed to a hollow body of metal.

Modifications of the present invention may occur to those skilled in the art, however, such modifications are contemplated as coming within the invention as defined by the claims appended hereto.

What is claimed is:

1. The method of sealing a hollow body of glass to metal which comprises juxtaposing the glass and metal, heating the metal and rendering the glass plastic and thereafter forcing the glass against the metal by bringing the edge of the glass against the metal and then gradually bringing the remainder of the glass thereagainst.

2. The method of sealing a tubular body of glass to a tubular body of metal which comprises inserting the tubular body of glass within the tubular body of metal so that the edge of the tubular body only contacts with the tubular body of metal, heating said metal to a high temperature by directing a flame against the metal at the place where the glass contacts therewith and thereafter forcing the glass by air pressure into contact with the metal.

3. The method of forming a seal between a tubular glass body and a tubular metal body free from entrapped air bubbles which comprises heating the metal body to a high temperature and simultaneously heating the glass body to plasticity, and fusing the metal body to the glass body by bringing the two into contact by air pressure, said contact being effected by gradually laying the glass body against the metal body and permitting at the same time the air disposed between the two bodies to exude therefrom adjacent the edge of the metal body.

4. The method of uniting a glass tube and a metal tube which consists in outwardly flaring the metal tube and welding the glass tube to said outwardly flared portion by first joining the end of the glass tube to the narrow portion of the flared part of the metal tube and then gradually laying the glass of the glass tube against the flared portion outwardly toward the edge of the flared part of the metal tube.

5. A seal for tubular glass and metal bodies comprising a body of metal such as copper having an annular flange reduced in thickness, an annular stop adjacent the lower edge of said annular flange and a tubular glass body sealed to said annular flange.

In testimony whereof, I have hereunto subscribed my name this 12th day of January, 1926.

CLAYTON TRIDLE ULREY.